Patented Oct. 27, 1942

2,299,946

UNITED STATES PATENT OFFICE 2,299,946

TREATMENT OF HAM

Lee Orton Alkire, Chicago, Ill., assignor to Industrial Patents Corporation, Chicago, Ill., a corporation of Delaware No Drawing. Application July 24, 1940, Serial No. 347,305

9 Claims. (Cl. 99—107)

This invention relates to a method of treating hams and has to do particularly with the preparation of cooked boneless hams.

An object of the invention is to provide an improved boned pressed ham which will not fall apart at the lines of cleavage.

Another object of the invention is to provide a method for treating ham and like products whereby the product can be conveniently sliced in an automatic slicer.

Another object of the invention is to combine the superior flavor of a ham which has been cooked with the bone in with the superior binding quality of a ham which has been boned prior to cooking.

Other objects of the invention will be apparent from the description and claims which follow.

Boned and cooked hams have long been an important food item as they permit the retail merchant to readily slice the product into relatively thin slices. The item is well liked by the housewife as it provides a meat product which is already cooked, which can be purchased in small quantities, and which is in the form of thin slices ready for use. However, in the past there have been two objections to cooked boneless ham: If the ham was cured and cooked prior to the boning operation, the meat did not bind together at the incision through which the bones were removed. Although the hams were later pressed into a predetermined shape by the use of forms and pressure, the product tended to fall apart at the line of cleavage. This was particularly objectionable when the product was sliced as the slices fell apart instead of giving a pleasing appearance of uniform, solid slices. On the other hand, if the ham was boned prior to cooking, the meat, because of the cooking process, tended to bind it together in a uniform mass. However, in this process a great deal of flavor was lost as juices were permitted to escape from the ham by the incision which necessarily had to be made to remove the bone.

My present invention is an improvement of the method of preparing boned ham, in which I am able to retain the flavor of a ham cooked without boning, and also secure a ham which will not separate at the lines of cleavage, even when sliced into very thin slices.

For the purposes of my invention I prefer to use what is known as a fast cure ham. I have found that a ham pumped by the vein or needle method, and then carried in cover pickle for from five to twenty days results in a much superior product. Hams cured by the old method, which consists in carrying them in cover pickle for from sixty to ninety days, do not bind as satisfactorily as hams prepared by the fast cure method. For example, the freshness of fast cured hams helps to retain its binding qualities so that the finished ham can be sliced successfully without falling apart. This may be due, at least in part, to a stronger gelatin which has not broken down or deteriorated so much as the gelatin of hams cured by the old method.

After curing, the hams are removed from the pickle and transferred to a soaking vat where they are soaked in water for a period of time, and then thoroughly scraped and scrubbed.

The hams are next placed in a stockinet bag and hung in an ordinary smoking room for smoking. The smoking can be done in any of the well-known processes, although I prefer to give the ham a heavy smudge for a number of hours in a gradually rising temperature. After the desired smoking, I prefer to leave the hams in the smoke oven until an inside temperature of approximately 115 to 125 degrees F. is reached. When the hams have reached the desired inside temperature, they are removed from the smoke oven and transferred to a cooking oven wherein a suitable high temperature and a high humidity are maintained throughout the cooking process.

The cooking oven is preferably maintained at a high temperature and a relatively high humidity. The cooking period is preferably relatively long, usually in excess of twenty-four hours. It will be understood, of course, that the period of time in the cooking oven will depend primarily upon the weight of the ham and the temperature at which the oven is maintained.

After the hams have been thoroughly cooked, they are removed from the cooking oven, and the stockinet bag is removed. The hams are immediately boned so that the temperature of the ham, and especially the inside temperature, will not have an opportunity to drop. The boned ham is then placed on a piece of cloth, such as muslin, the muscles of the shank forced into the cavity left by the removal of the bone and the ham tightly wrapped. Preferably at this point the ham is pounded on the work table a few times in order to somewhat soften the ham and make it more pliable for moulding. The ham, still enclosed in the cloth, is next placed in a standard ham retainer in the usual manner. The ham retainer cover is placed upon the retainer and forced thereon by a standard ham press, usually operating at a pressure of approximately eighty pounds per square inch. The cover is forced down onto the ham and held tightly thereon by means of the ratchet arrangement common to all ham moulds. Retainers containing the hams are immediately transferred to a cold storage freezer, preferably one maintained at a temperature of zero degrees F., or less, and held for a number of hours, usually 6-8 hours, until thoroughly chilled throughout. The hams are then removed from the retainer, the cloth removed, and the hams wrapped for shipping. The wrapped hams preferably are held in a cooler room, usually maintained at a temperature of 32-34 degrees F. for a minimum of twenty-four hours before shipping.

Products prepared in the above described manner have been found to bind together exceptionally well, and to be suitable for slicing. In addition such a product has the improved flavor which results from the cooking of hams with the bone in.

It will be readily apparent that products prepared by the method above disclosed are a distinct improvement over products heretofore known, which either lacked the superior flavor of the ham cooked with the bone in, or else they did not bind together.

It is to be understood that the invention is not limited to the detailed process above described, but may comprehend such other processes, arrangements of details or features as may be consistent with the claims and the prior art.

I claim:

1. The method of preparing boneless cooked hams, which comprises quick curing a ham containing a bone, cooking the cured product, removing the bone from the cooked ham while hot, pressing the hot boneless meat to remove the void produced by removal of the bone and cooling the product while it is held under pressure.

2. The method of preparing boneless cooked ham products of improved slicing qualities, which comprises subjecting the ham with the bone in to a quick curing operation whereby the meat is cured rapidly and the binding qualities thereof are retained, smoking and cooking the cured product, removing the bone from the cooked ham while hot, pressing the hot boneless meat into a compact form and cooling the product while it is held under pressure.

3. The method of treating hams, which comprises subjecting the ham to a quick cure for insufficient time to destroy the binding qualities thereof, smoking the cured ham, cooking the smoked product, removing the bone from the hot cooked product, pressing the hot ham to form a compact mass and cooling the product while under pressure.

4. The method of treating hams, which comprises subjecting the ham to a quick cure for insufficient time to destroy the binding qualities thereof, cooking the cured ham, removing the bone at substantially the inside temperature obtained in cooking and pressing the hot ham and cooling the resulting product while under pressure to produce a compact coherent mass.

5. The method of treating quick cured ham which comprises smoking the cured him in a relatively heavy smudge, cooking the smoked ham, removing the bone therefrom while hot, subjecting the boned hot ham to pressure within a form of predetermined size and shape, and rapidly chilling the ham in a low temperature freezer while subjected to pressure.

6. The method of treating fast cured ham which comprises soaking the cured ham in water, cooking the ham, removing the bone therefrom immediately after cooking, subjecting the hot boned ham to pressure within a form of predetermined size and shape, and rapidly chilling the ham while subjected to such pressure.

7. The method of treating ham which comprises smoking a fast cured ham, removing the ham to a cooking oven maintained constantly at a high temperature and relatively high humidity, thoroughly cooking such ham in such cooking oven, boning the ham immediately upon removal from the oven and prior to cooling thereof, inserting the shank portion of the ham within the cavity formed by the removal of the bone, placing the hot boned ham within a suitable container, subjecting the hot boned ham to considerable pressure, and rapidly chilling the boned ham in a low temperature freezer while subjected to such pressure.

8. The method of treating ham which comprises smoking a fast cured ham immediately after curing and washing, removing the ham to a cooking oven maintained at a constant high temperature and relatively high humidity, thoroughly cooking such ham in such cooking oven, removing the bone from the ham immediately upon removal from the oven and prior to cooling thereof, inserting the shank portion of the ham within the cavity formed by the removal of the bone, placing the hot boned ham within a suitable container and subjecting the hot boned ham to considerable pressure, and rapidly chilling the boned ham in a temperature of zero degrees F. or lower, while subjected to such pressure.

9. The method of treating hams, which comprises quick curing the ham by internal application of the curing medium, cooking the cured ham, removing the bone from the cooked ham while hot, pressing the hot ham to a compact form, and chilling the mass in a low temperature freezer while under pressure, whereby a product of improved binding and slicing qualities is obtained.

LEE ORTON ALKIRE.